Patented May 3, 1932

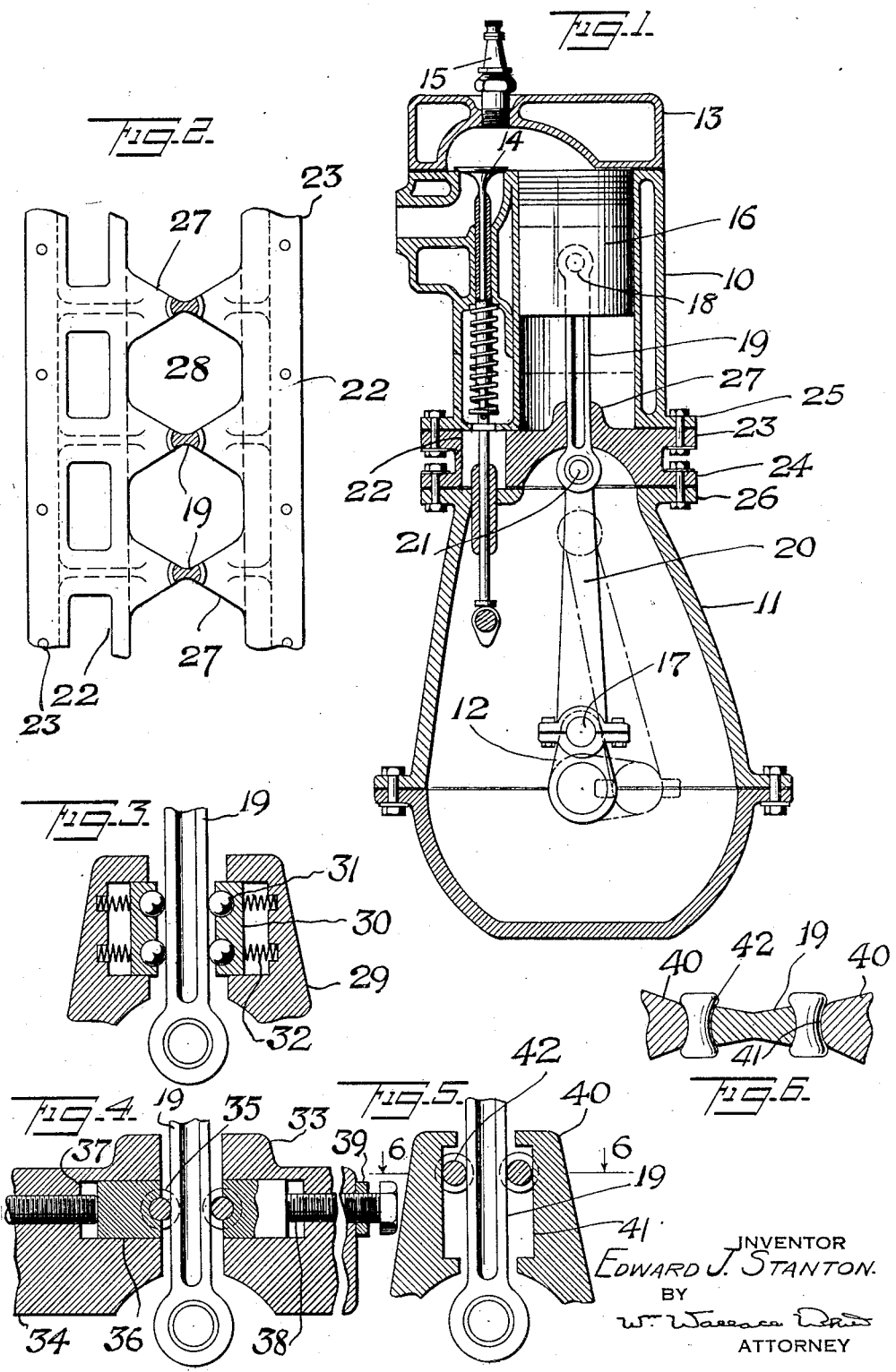

1,856,359

UNITED STATES PATENT OFFICE

EDWARD J. STANTON, OF BROOKLYN, NEW YORK

SINGLE ACTING ENGINE

Application filed September 1, 1928. Serial No. 303,521.

This invention relates to single-acting reciprocating engines and although the invention is particularly applicable to automobile engines it may also be applied to engines for other purposes.

One object of this invention is to provide improved means for guiding the piston in the cylinder and for preventing uneven pressure and wear between the piston and the cylinder walls.

In accordance with this invention the uniform pressure and wear between the piston and cylinder wall ensures greater gas-tightness and reduces friction losses with consequent increase in power. Greater compression may also be obtained and more efficient lubrication may be effected. A consequent saving in fuel and lubricant may thus result and other advantages will be clearly apparent from a perusal of the detailed description.

A further object of the invention is to provide improved means for guiding a piston rod and for connecting such rod to the piston.

With the above and other objects in view the invention consists in the novel construction and arrangement of parts hereinafter described, illustrated in the accompanying drawings, and particularly pointed out in the appended claims, it being understood that various changes in the form and constructional details may be made without departing from the spirit of the invention or sacrificing any of the advantages thereof.

In the drawings:

Figure 1 is a vertical cross-section of an engine having my invention applied thereto; Fig. 2 is a plan view of a portion of the special guide-block for a multi-cylinder engine; Fig. 3 is a detail section showing the guide means for a piston-rod; Figs. 4 and 5 are similar views but showing modified forms of the guide means; and Fig. 6 is a cross-section taken on the line 6—6 Fig. 5.

The engine shown at Fig. 1 comprises a cylinder-block 10, a crank-case 11, a crank 12, a cylinder head 13, a valve 14, a sparking plug 15 and a piston 16 all of usual or ordinary construction. Instead of the usual connecting rod extending from the crank pin 17 to the wrist-pin 18 I provide a piston rod 19 and a connecting rod 20 jointed together at 21 and connected to the wrist-pin 18 and to the crank-pin 17 respectively. In the arrangement here shown the cylinder block 10 is spaced from the crank-casing 11 to accommodate the special guide block 22 which is formed with flanges 23, 24 for attachment to the flanges 25 on the cylinder block and to the flanges 26 on the crank-case. In line with each piston rod 19 the guide block 22 has a pair of brackets 27 which engage the sides of the piston rod 19 and serve as guides therefor.

As shown at Fig. 2 the brackets 27 are shaped to conform to the sides of the piston rod 19, and open spaces 28 are provided between adjacent pairs of brackets so that splash feed lubrication to the cylinder walls is not prevented by the guide block 22. The cross-sectional form of the piston-rods 19 and the shape of the brackets 27 are such that rotation of the piston-rods through 90 degrees permits sidewise movement of such rods into or out of their bearings and dismantling and assembling of the parts are thus facilitated.

In the arrangement shown at Fig. 3, brackets 29 correspond to the guide brackets 27 and are each provided with a yielding block 30 having anti-friction bearings 31 for engaging the piston-rod and having springs 32 holding such bearings in yielding contact with the said rod.

In the form illustrated at Fig. 4 guide brackets 33 in a guide block 34 are each provided with a guide roller 35 carried by a slide 36 mounted in a recess 37 and adapted to be adjusted from the outside of the engine by means of a screw stud 38 having a locknut 39.

In the guide arrangement shown at Figs. 5 and 6, guide brackets 40 are each formed with a groove 41 and suitable guide means for an anti-friction roll 42 which engages the surface of the piston rod 19 and, at each stroke of the piston, travels a distance equal to one half the length of such stroke.

Although the drawings and the above specification disclose the best modes in which I have contemplated embodying my invention I desire to be in no way limited to the details of such disclosure, for, in the further practical application of my invention many changes in form and construction may be made, as circumstances require or experience suggests without departing from the spirit of the invention within the scope of the appended claims.

Although the parts 11 to 16 both inclusive may be of usual construction it will be understood that they may be improved or modified within the scope of my claims and the length of the piston and cylinder may be considerably reduced.

What I claim is:

1. A single-acting reciprocating engine comprising a piston, a connecting-rod, a piston-rod jointed at one of its ends to the connecting-rod, and two separate guide members extending into the cylinder for guiding the piston-rod in a substantially straight line.

2. A single-acting reciprocating engine comprising a piston, a connecting-rod, a piston-rod jointed at one of its ends to the connecting-rod, a block interposed between the piston and the connecting-rod, and two opposed guide members carried by said block and engaging the sides of the piston-rod in the lower part of the cylinder to guide said piston-rod in a substantially straight line.

3. A single-acting reciprocating engine comprising a piston, a connecting-rod, a piston-rod jointed at one of its ends to the connecting-rod, and two opposed anti-friction means extending into the cylinder for guiding the piston-rod in a substantially straight line.

4. A single-acting reciprocating engine comprising a hollow piston, a connecting-rod, a piston-rod jointed at one of its ends to the connecting-rod, a wrist-pin connecting the other end of the piston-rod to the piston, and rolling bearings extending into the cylinder and adapted to enter the hollow part of the piston for guiding the piston-rod in a substantially straight line.

5. A single-acting reciprocating engine comprising a piston, a piston-rod connected to the piston, and two separate opposed guide means extending into the lower end of the cylinder and comprising rolling members for guiding the piston-rod in a substantially straight line.

6. A single-acting reciprocating engine comprising a piston, a piston-rod connected to the piston, and two separate opposed guide means extending into the open end of the cylinder and comprising wear-take-up devices for guiding the piston-rod in a substantially straight line.

7. A single-acting reciprocating engine comprising a piston, a piston-rod connected to the piston, and two separate opposed guide means extending into the cylinder and comprising rolling bearings and adjusting mechanism for guiding the piston-rod in a substantially straight line.

8. A single-acting multi-cylinder engine comprising a cylinder-block, a crank-case, a guide block interposed between and secured to the cylinder block and crank-case, a piston-rod, and separate opposed bearing brackets projecting inwardly from the guide block and extending into the open end of the cylinder and engaging the sides of the piston-rod.

9. A single-acting multi-cylinder engine comprising a cylinder-block, a crank-case, a guide block interposed between the said cylinder block and crank-case, a connecting rod, a piston-rod connected at one of its ends to the piston and at its other end to the connecting-rod, and separate opposed guide means carried by the guide-block and extending upwardly into the cylinder and engaging the sides of said piston-rod.

10. A single-acting multi-cylinder engine comprising a cylinder-block, a crank-case, a guide block interposed between the said cylinder-block and crank-case and secured therebetween, a connecting rod, a piston-rod connected at one of its ends to the piston and at its other end to the connecting-rod, and two opposed piston-rod guide brackets carried by the said guide blocks and extending into each cylinder and spaced from each other to provide open spaces for splash fed lubricant.

11. A single-acting reciprocating engine comprising a cylinder-block, a crank-case, a guide-block interposed between the cylinder-block and the crank-case, a connecting-rod, a piston-rod connected at one of its ends to the piston and at its other end to the connecting-rod, and piston-rod guide brackets extending into the cylinder and carried by the guide-block at each side thereof and spaced from each other to permit side-wise introduction of the piston-rod only when the latter is turned through 90 degrees from its operative position.

12. A reciprocating engine of the character described which comprises a piston-rod, a connecting-rod, and guide means for the piston-rod comprising a pair of inwardly projecting brackets extending into the cylinder and having opposed concave bearing surfaces for engaging the side faces of the piston-rod, the distance between said opposed surfaces being such that the piston-rod can be laterally removed after rotation through 90 degrees from its operative position.

13. A reciprocating engine of the character described which comprises a piston-rod, a connecting-rod, and guide means for the piston-rod comprising bearing brackets extending into the cylinder and having opposed concentric arcuate bearing surfaces spaced from each other to permit the introduction of the piston-rod and to closely engage the side faces thereof when the piston-rod is turned through 90 degrees into its operative position.

In testimony whereof I have signed my name to this specification.

EDWARD J. STANTON.